United States Patent
Vemulapati et al.

(10) Patent No.: US 10,500,932 B2
(45) Date of Patent: Dec. 10, 2019

(54) DOOR ASSEMBLY

(71) Applicant: Ford Global Technologies, LLC, Dearborn, MI (US)

(72) Inventors: Satyanarayana Raju Vemulapati, Westland, MI (US); Deepak Patel, Canton, MI (US); Scott Holmes Dunham, Redford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 294 days.

(21) Appl. No.: 15/345,631

(22) Filed: Nov. 8, 2016

(65) Prior Publication Data
US 2018/0126828 A1    May 10, 2018

(51) Int. Cl.
B60J 5/04 (2006.01)
(52) U.S. Cl.
CPC .................................. B60J 5/0451 (2013.01)
(58) Field of Classification Search
CPC .................................. B60J 5/042; E06B 7/00
See application file for complete search history.

(56) References Cited

U.S. PATENT DOCUMENTS

| | | | |
|---|---|---|---|
| 3,442,501 A * | 5/1969 | Soderberg | F16F 9/303 267/127 |
| 3,489,087 A * | 1/1970 | Soderberg | F16F 9/512 102/277 |
| 3,870,130 A * | 3/1975 | Miller | F16F 9/303 188/268 |
| 3,919,941 A * | 11/1975 | Breed | F42C 15/285 102/250 |
| 5,154,445 A * | 10/1992 | Weller | B60R 21/0428 280/751 |
| 5,433,478 A | 7/1995 | Naruse | |
| 5,857,734 A | 1/1999 | Okamura et al. | |
| 6,148,970 A * | 11/2000 | Akad | B60R 19/36 188/266 |
| 6,237,333 B1 * | 5/2001 | Lee | B64C 25/22 60/487 |
| 7,610,984 B2 | 11/2009 | Melz et al. | |
| 7,896,019 B2 | 3/2011 | Bettin et al. | |
| 8,646,562 B2 | 2/2014 | Fukawatase et al. | |
| 8,827,350 B1 | 9/2014 | Deng et al. | |

(Continued)

FOREIGN PATENT DOCUMENTS

| | | |
|---|---|---|
| CN | 203496819 U | 3/2014 |
| CN | 206485176 U | 9/2017 |

(Continued)

OTHER PUBLICATIONS

Machine translation of JP2016-172512 (Year: 2016).*

(Continued)

*Primary Examiner* — Hilary L Gutman
(74) *Attorney, Agent, or Firm* — Frank A. MacKenzie; Bejin Bieneman PLC

(57) ABSTRACT

A door assembly includes a door and a pusher. The door defines a cavity. The pusher is fixed to the door in the cavity, and the pusher contains a non-Newtonian fluid. The door assembly may be installed in a vehicle. Because the pusher contains a non-Newtonian fluid, the pusher distributes force from the impact to an occupant in a manner that depends on a size of the occupant.

20 Claims, 8 Drawing Sheets

(56) References Cited

U.S. PATENT DOCUMENTS

| | | | |
|---|---|---|---|
| 9,062,732 B2* | 6/2015 | Aramizu | F16F 5/00 |
| 9,127,799 B2* | 9/2015 | Brinkmann | F16L 55/02727 |
| 9,453,550 B2* | 9/2016 | Smith | B64C 25/58 |
| 9,890,574 B2* | 2/2018 | Kruedener | E05F 5/006 |
| 2012/0180627 A1* | 7/2012 | Hunn | F41H 5/04 89/36.02 |
| 2012/0186003 A1* | 7/2012 | Heger | A41D 13/015 2/412 |
| 2012/0329896 A1* | 12/2012 | Bloomfield | C08G 77/56 521/152 |
| 2013/0015644 A1* | 1/2013 | Tamura | B60R 21/0428 280/730.2 |
| 2014/0062068 A1* | 3/2014 | Suesada | B60R 21/23138 280/730.2 |
| 2015/0251617 A1 | 9/2015 | Gandhi | |
| 2017/0113641 A1* | 4/2017 | Thieberger | B60R 1/00 |
| 2017/0113702 A1* | 4/2017 | Thieberger-Navon | B60W 50/14 |
| 2018/0111453 A1* | 4/2018 | Patel | B60J 5/0455 |
| 2018/0154860 A1* | 6/2018 | Thieberger | B60R 21/36 |
| 2018/0244232 A1* | 8/2018 | Suzuki | B60R 21/0428 |
| 2018/0281714 A1* | 10/2018 | Gandhi | B60R 19/20 |

FOREIGN PATENT DOCUMENTS

| | | | | |
|---|---|---|---|---|
| DE | 102016120430 A1 * | 4/2017 | | B60R 1/00 |
| EP | 2620319 A1 | 7/2013 | | |
| JP | 2008056188 A * | 3/2008 | | |
| JP | 2012153242 A | 8/2012 | | |
| JP | 2012171610 A | 9/2012 | | |
| JP | 2012171611 A | 9/2012 | | |
| JP | 2014046726 A * | 3/2014 | | |
| JP | 2016172512 A * | 9/2016 | | |

OTHER PUBLICATIONS

Search Report from United Kingdom Intellectual Property Office dated Apr. 3, 2018 regarding GB Application No. 1718168.6 (4 pages).

* cited by examiner

US 10,500,932 B2

DOOR ASSEMBLY

BACKGROUND

Vehicles include safety features for side impacts. A side impact occurs when an impactor, such as another vehicle, a pole or tree, etc., travels into a side of the vehicle, for example, into a door of the vehicle. A frame of the vehicle absorbs some energy from a side impact. The vehicle may have seatbelts including shoulder straps. The shoulder straps are typically arranged over an outboard shoulder of the occupant, thus restricting an occupant's outboard motion toward a side impact. The vehicle may have side curtain airbags that deploy over a window opening during a side impact. The side curtain airbags cushion a head and upper body of the occupant from the window or from the impactor.

DETAILED DESCRIPTION

Figure 1:
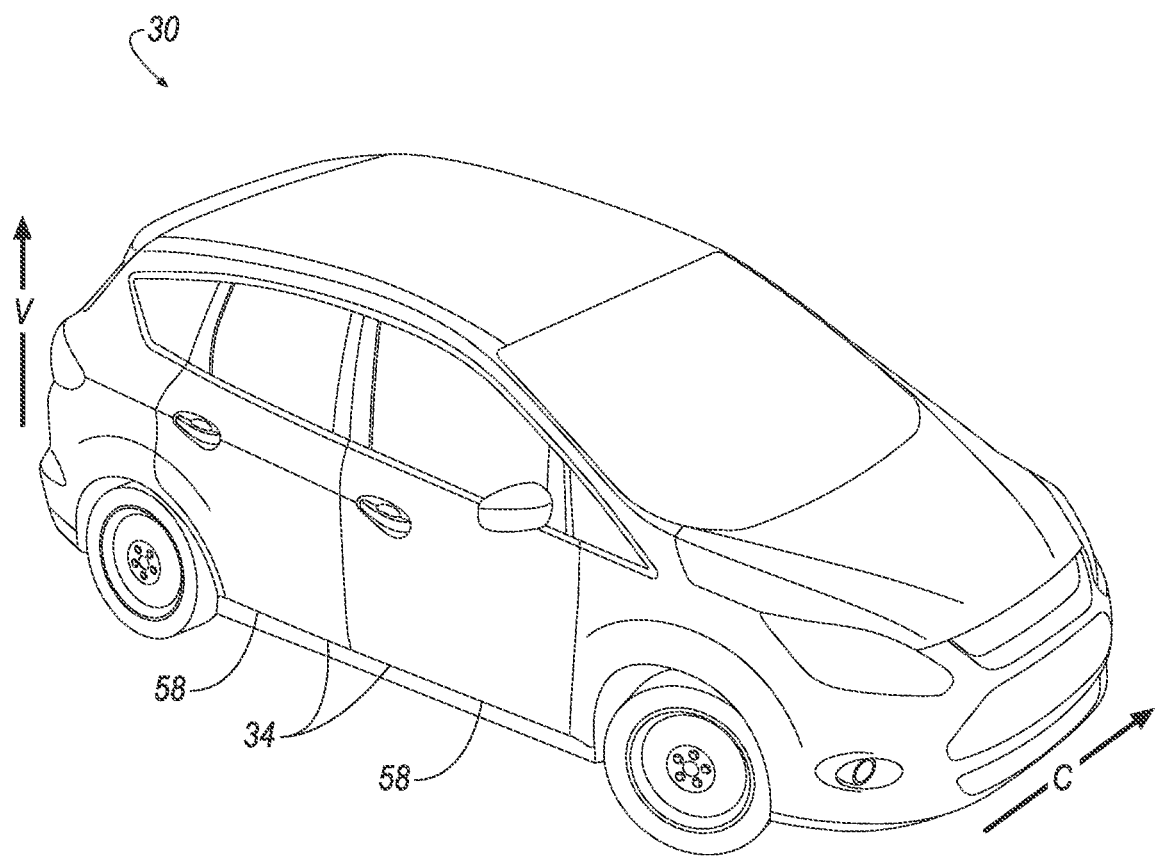
FIG. 1 is a perspective view of a vehicle.

With reference to the Figures, wherein like numerals indicate like parts throughout the several views, a door assembly 32 for a vehicle 30 includes a door 34 and a pusher 36. The door 34 defines a cavity 38. The pusher 36 is fixed to the door 34 in the cavity 38, and the pusher 36 contains a non-Newtonian fluid 40.

During a side impact, the door assembly 32 distributes force from the impact to an occupant in a manner that depends on a size of the occupant. Specifically, as set forth further below, since the pusher 36 contains a non-Newtonian fluid, the energy-absorbing characteristics of the pusher 36 varies based on the size of the occupant that impacts the door 34 during an impact. For a larger occupant, the pusher 36 becomes stiffer during the impact, transferring more force to the occupant but more effectively pushing the occupant away from a zone of the impact and thus potentially reducing injuries from the impact. For a smaller occupant, the pusher 36 becomes less stiff during the impact, transferring less force to the occupant while still pushing the occupant away from the zone of impact. The differential transference of force can potentially reduce injury during side impacts.

Figure 2:
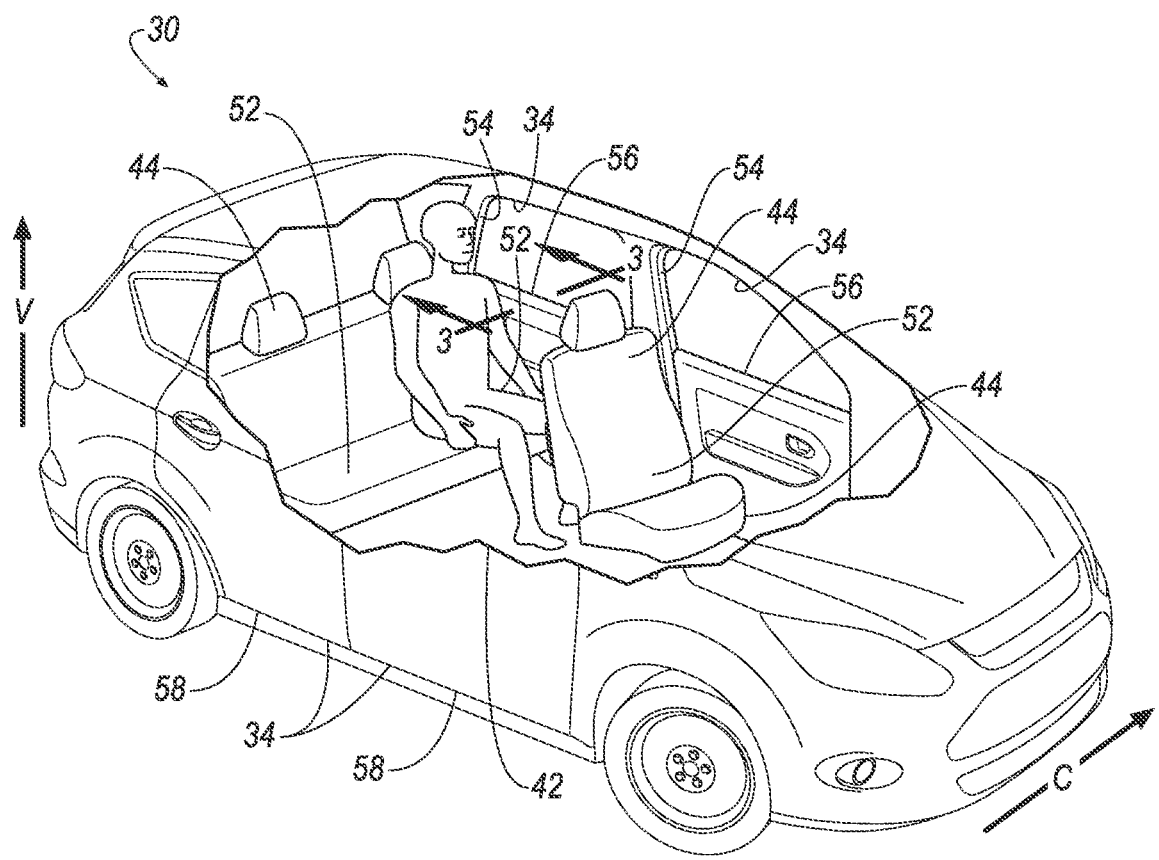
FIG. 2 is a perspective view of the vehicle with an occupant cabin exposed.

With reference to FIGS. 1 and 2, the vehicle 30 includes an occupant cabin 42 to house occupants, if any, of the vehicle 30. The vehicle 30 includes the doors 34 that can be closed and opened to provide access between the occupant cabin 42 and outside the vehicle 30. The doors 34 may be positioned as any one or more of a front driver door, front passenger door, rear door, etc. The occupant cabin 42 includes one or more rows of seats 44. The seats 44 may be bucket seats, bench seats, or any other type of seat. The position and orientation of the seats 44 and components thereof may be adjustable by an occupant.

With reference to FIGS. 2 and 4-6, the seat 44 may include a seat back 46, a seat bottom 48, and a headrest 50. The seat 44 defines an occupant area 52 between the seat bottom 48 and the seat back 46 in which an occupant of the vehicle 30 can sit. In other words, the occupant area 52 is in the occupant cabin 42 inboard of a door trim 56 and extends along the seat bottom 48 and the seat back 46 and receives the occupant when the occupant is seated on the seat bottom 48 and leaning against the seat back 46, as shown for example in FIGS. 2 and 4-6.

The headrest 50 may be supported by the seat back 46 and may be stationary or movable, e.g., raised and lowered, relative to the seat back 46. The seat back 46 may be supported by the seat bottom 48 and may be stationary or movable, e.g., reclinable, relative to the seat bottom 48. The seat back 46, the seat bottom 48, and/or the headrest 50 may be adjustable in multiple degrees of freedom. Specifically, the seat back 46, the seat bottom 48, and/or the headrest 50 may themselves be adjustable, in other words, adjustable components within the seat back 46, the seat bottom 48, and/or the headrest 50, and/or may be adjustable relative to each other.

Figure 3:
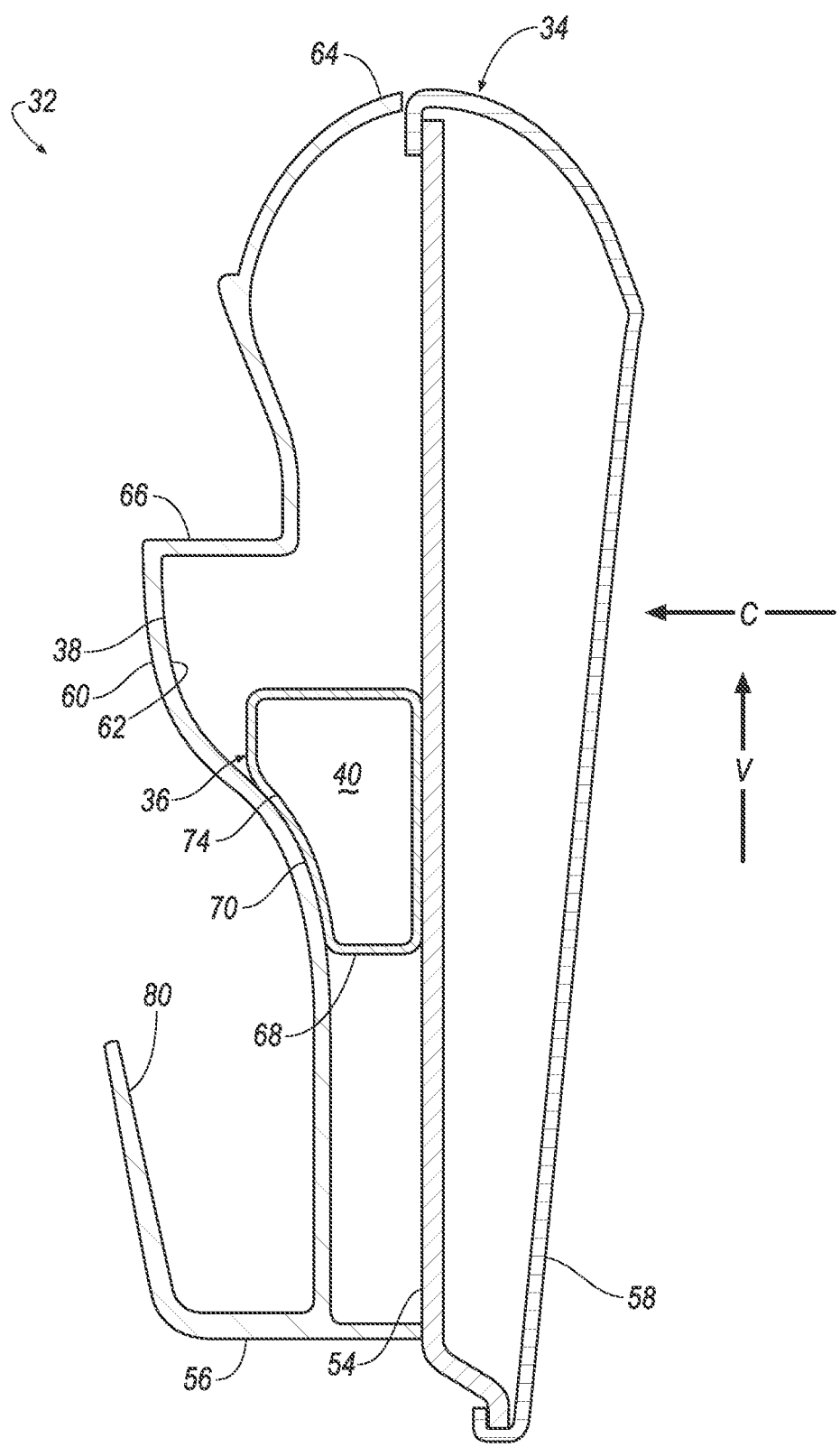
FIG. 3 is a front cross-sectional view of a door of the vehicle.

With reference to FIG. 3, the door 34 includes a door inner 54, the door trim 56 fixed relative to the door inner 54, and a door outer 58 fixed relative to the door inner 54. The door trim 56 is fixed opposite the door outer 58 relative to the door inner 54. The door trim 56 is inboard relative to the door inner 54, and the door outer 58 is outboard relative to the door inner 54. The door 34 defines the cavity 38. The cavity 38 may be between the door outer 58 and the door trim 56 or more specifically between the door inner 54 and the door trim 56. The door 34 defines a vertical direction V, that is, a direction pointing up relative to the vehicle 30 to which the door 34 is attached.

The door outer 58 faces outboard relative to the vehicle 30. The door outer 58 may present a class-A surface (not numbered), i.e., a surface specifically manufactured to have a high-quality, finished aesthetic appearance free of blemishes. The door outer 58 may be, for example, formed of steel, aluminum, fiber reinforced plastic composite, etc.

Figure 5:
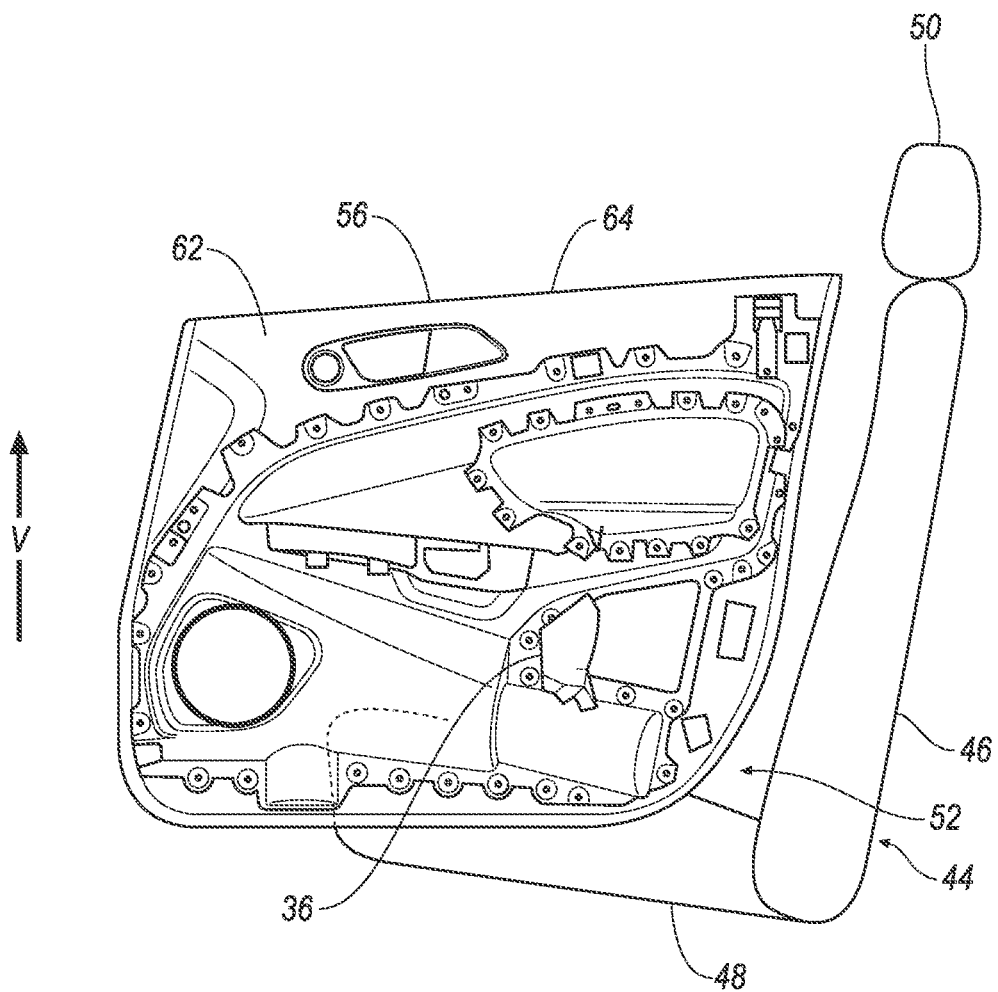
FIG. 5 is an opposite side view of the door inner, the door trim, and the seat.
Figure 6:
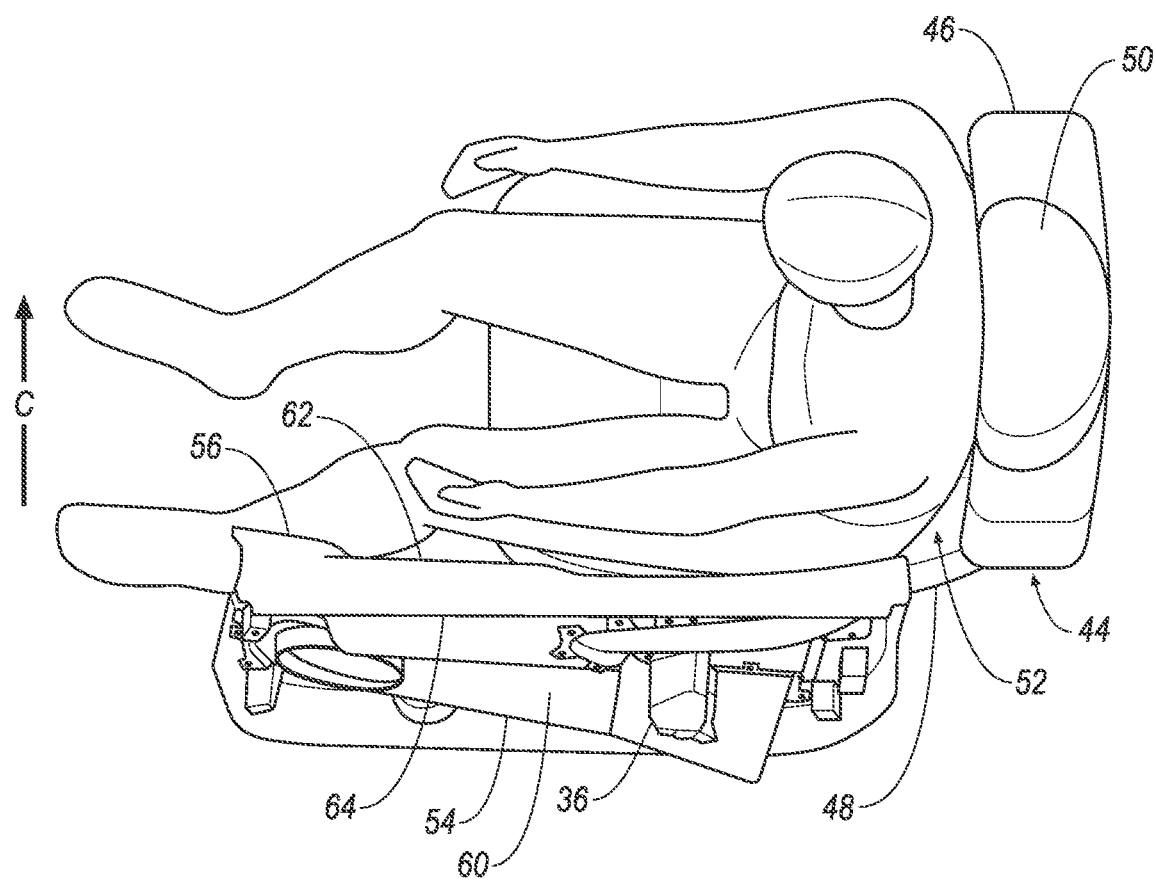
FIG. 6 is a top view of the door inner, the door trim, and the seat.

With reference to FIGS. 3 and 5, the door inner 54 may be formed of a metal such as steel or aluminum, a fiber reinforced plastic composite, etc., and provides structural rigidity for the door 34. The door inner 54 may provide a mounting location for components of the door 34 such as sliding windows (not shown).

Figure 4:
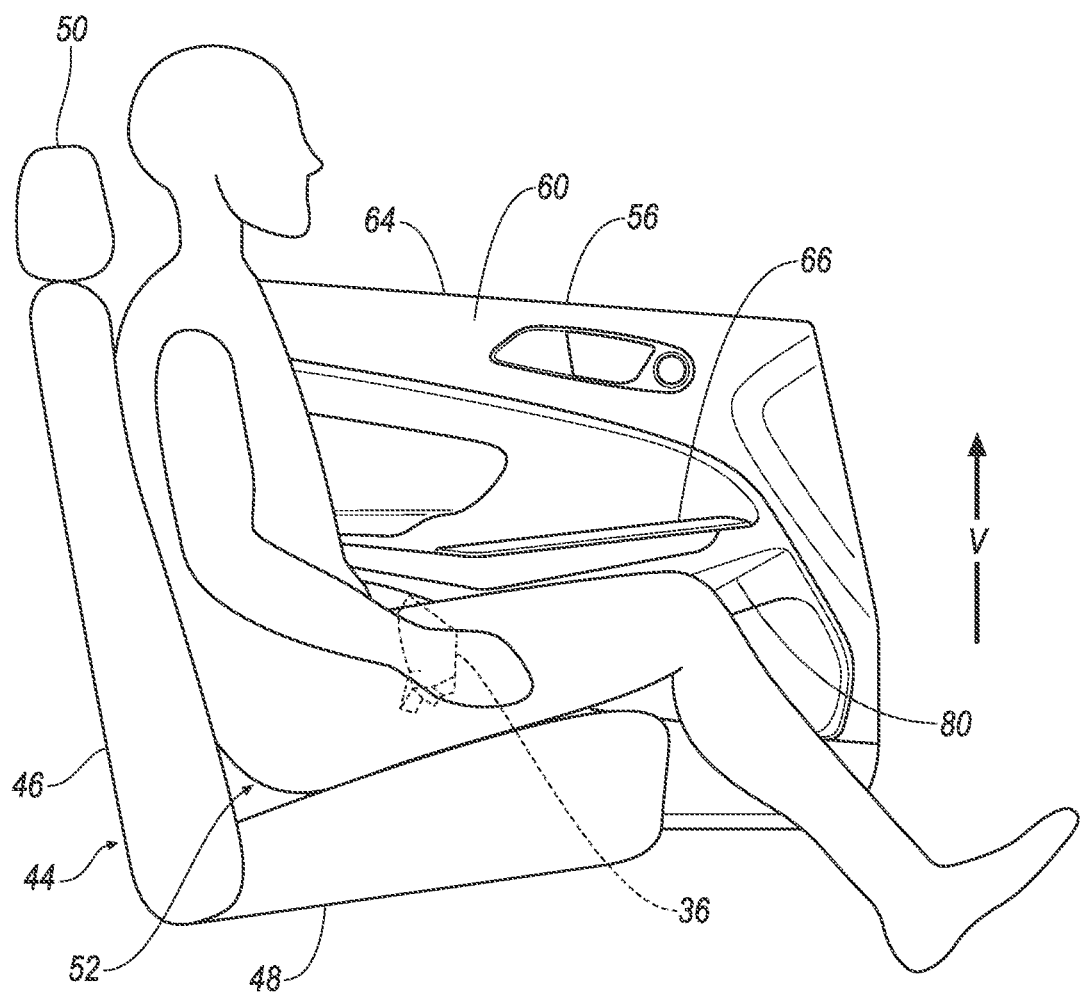
FIG. 4 is a side view of a door inner, a door trim, and the seat.

With reference to FIGS. 3 and 4, the door trim 56 includes an outer surface 60 and an inner surface 62 opposite the outer surface 60. The outer surface 60 faces inboard toward the seat 44, and the inner surface 62 faces outboard toward the door inner 54. The door trim 56 may be formed of materials suitable for an interior of the vehicle 30, such as vinyl, plastic, leather, wood, etc. The door trim 56 may include an upper edge 64 defining a bottom of a window opening relative to the vertical direction V. The door trim 56 includes an armrest 66 disposed below the upper edge 64 and protruding away from the door 34. The armrest 66 may be positioned at a height convenient for an occupant to access with his or her arm. The door trim 56 includes an open pocket 80, sometimes referred to as a map pocket, which may be disposed below the armrest 66 in the vertical direction V.

With reference to FIGS. 3-6, the pusher 36 is fixed to the door 34 in the cavity 38. Specifically, the pusher 36 is disposed between the door outer 58 and the door trim 56.

The pusher 36 may be fixed to the door trim 56. The inner surface 62 of the door trim 56 faces the pusher 36. As one example, the pusher 36 may be fixed to the inner surface 62 of the door trim with mechanical fasteners and/or adhesive. As another example, the pusher 36 and the door trim 56 may be integral; that is, the pusher 36 and the door trim 56 may be formed together simultaneously as a single integral unit. Alternatively, the pusher 36 and the door trim 56 may be formed separately and subsequently assembled together. Additionally or alternatively, the pusher 36 may be attached to the door inner 54.

The pusher 36 may be located below the armrest 66 relative to the vertical direction V. The pusher 36 may be aligned with the occupant area 52 of the seat 44 in a cross-vehicle direction C, that is, an inboard-outboard direction relative to the door 34. More specifically, the pusher 36 may be aligned with an area that would be occupied by a thigh of an occupant of the seat 44 in the cross-vehicle direction C.

Figure 7:
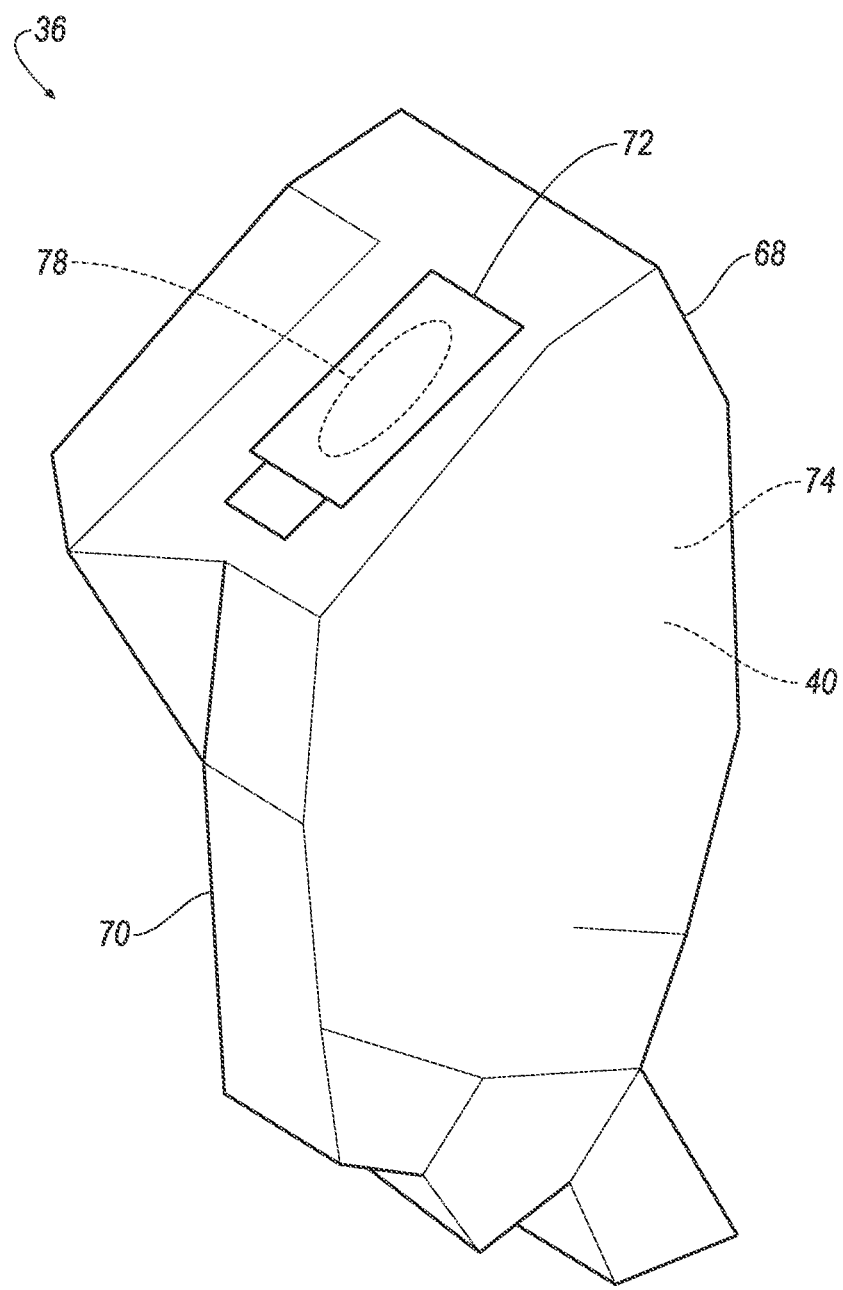
FIG. 7 is a perspective view of the pusher.

With reference to FIG. 7, the pusher 36 includes a case 68. As set forth above, the pusher 36 is disposed between the door outer 58 and the door trim 56, and more specifically, the case 68 is disposed between the door outer 58 and the door trim 56. A shape of the case 68 may depend on a shape of the cavity 38, i.e., the shape of the door inner 54, the door outer 58, and/or the door trim 56.

The case 68 includes a case body 70 and a case lid 72 sealed to the case body 70 to define a pusher cavity 74. The case body 70 includes a case opening 78 covered by the case lid 72 when the case lid 72 is sealed to the case body 70 across the opening 78. The case opening 78 allows the non-Newtonian fluid 40 to be added to the pusher cavity 74. The case lid 72 may be sealed detachably or permanently to the case body 70.

The case 68 contains the non-Newtonian fluid 40. Specifically, the case 68 seals the non-Newtonian fluid 40 in the pusher cavity 74.

The case 68 is flexible relative to the door outer 58. During an impact of the door outer 58 by an object, the door outer 58 may be deformed toward the occupant area 52, which may push the door trim 56 toward the occupant and into contact with the occupant. As the door trim 56 is forced into the occupant, counteracting forces on the door outer 58 by the impacting object and on the door trim 56 by the occupant deforms the door trim 56, i.e., in a vehicle-outboard direction. As the door trim 56 deforms, the pusher 36 is squeezed between the door trim 56 and the door outer 58. Since the case 68 is flexible relative to the door outer 58, the door outer 58 deforms the case 68 to act on the non-Newtonian fluid 40. The case 68 may be formed of a plastic, e.g., rubber, polypropylene, nylon, etc.

Figure 8:
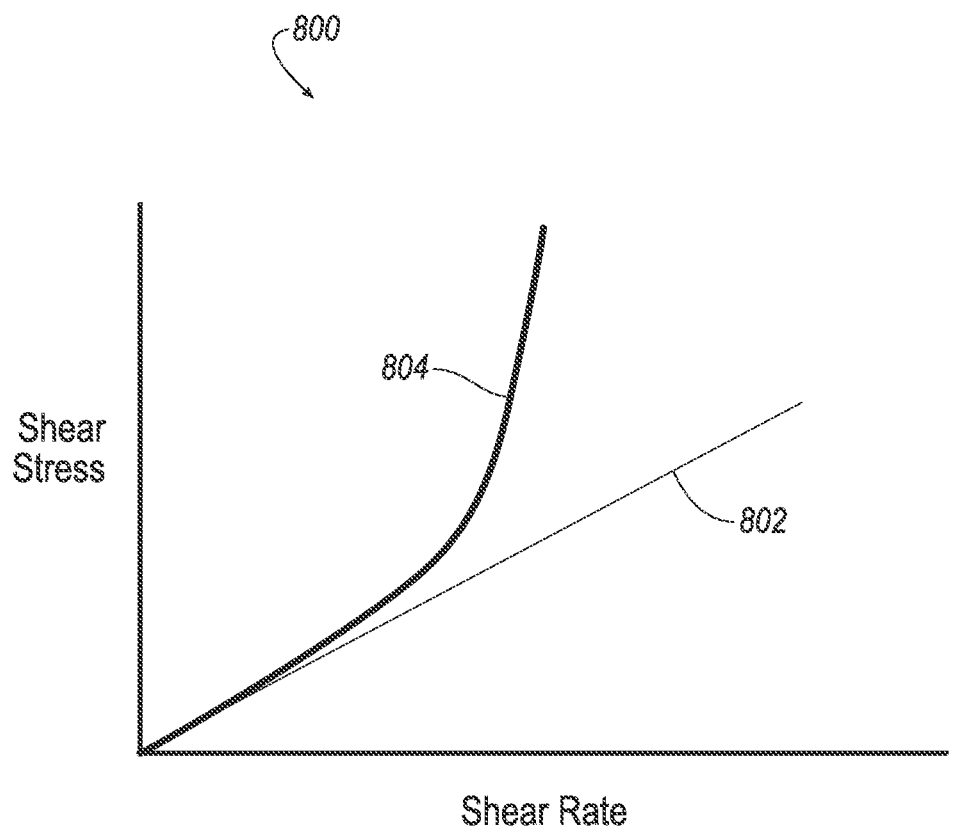
FIG. 8 is a graph of shear stress versus shear rate for a dilatant fluid.

With reference to FIG. 8, the non-Newtonian fluid 40 has an apparent viscosity that is dependent on shear rate or shear rate history, as opposed to a Newtonian fluid, which has a constant viscosity. A graph 800 in FIG. 8 shows shear stress versus shear rate for an example Newtonian fluid and an example non-Newtonian fluid 40. Apparent viscosity is the slope of a curve of shear stress versus shear rate, so a curve 802 for a Newtonian fluid is a line passing through the origin. The non-Newtonian fluid 40 may specifically be a dilatant fluid, also called a shear-thickening fluid, which has a viscosity that increases with shear rate, as shown by the increasing slope of a curve 804 in FIG. 8. An example of a dilatant fluid is concentrated starch.

In the event of a side impact, an impactor travels into the door outer 58 in the cross-vehicle, or inboard, direction C. Compression of the door outer 58 and door inner 54 by the impactor pushes the pusher 36 inboard toward a thigh of an occupant of the seat 44. The pusher 36 pushes the door trim 56 inboard toward into the thigh of the occupant, which distributes force from the impact along the thigh of the occupant. Because the pusher 36 contains the non-Newtonian fluid 40, the pusher 36 has a stiffness that depends on a mass of the occupant and thus a resistance from impacting the thigh of the occupant. For a larger occupant, the pusher 36 is stiffer and thus may more effectively push the occupant inboard away from a zone of the impact. For a smaller occupant, the pusher 36 is less stiff and thus may transfer less force from the impact while still pushing the occupant inboard away from the zone of the impact. The collision may also trigger other safety features, such as airbags and/or emergency locking retractors on seatbelts (not shown).

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A door assembly comprising:
   a door including a door outer and a door trim defining a cavity therebetween; and
   a pusher fixed to the door in the cavity between the door outer and the door trim and including a case containing a non-Newtonian fluid;
   wherein
   the case includes a plurality of flat panels, wherein at least two of the flat panels are contacting each other; and
   the case has a lower stiffness than the door outer.

2. The door assembly of claim 1, wherein the case includes a case body and a case lid sealed to the case body to define a pusher cavity, the non-Newtonian fluid being in the pusher cavity.

3. The door assembly of claim 2, wherein the non-Newtonian fluid is sealed in the pusher cavity.

4. The door assembly of claim 1, wherein the case is formed of plastic.

5. The door assembly of claim 1, wherein the door includes a door inner, and the door trim is fixed relative to the door inner.

6. The door assembly of claim 5, wherein the pusher is fixed to the door trim.

7. The door assembly of claim 6, wherein the door trim includes an outer surface and an inner surface opposite the outer surface, the inner surface facing the pusher and the outer surface including an open pocket.

8. The door assembly of claim 6, wherein the pusher and the door trim are integral.

9. The door assembly of claim 5, wherein the pusher is attached to the door inner.

10. The door assembly of claim 5, wherein the door trim includes an armrest disposed below an upper edge of the door trim and protruding away from the door.

11. The door assembly of claim 10, wherein the door defines a vertical direction, and the pusher is located below the armrest relative to the vertical direction.

12. The door assembly of claim 5, wherein the door outer is fixed relative the door inner, and the door trim is fixed opposite the door outer relative to the door inner.

13. The door assembly of claim 1, wherein the non-Newtonian fluid is a dilatant fluid.

14. The door assembly of claim 1, wherein the plurality of flat panels includes at least three flat panels.

15. The door assembly of claim 1, wherein the two flat panels that are contacting each other are oriented at an oblique angle relative to each other.

16. The door assembly of claim 1, wherein the two flat panels that are contacting each other intersect at a sharp corner, and the two flat panels that are contacting each other are each flat at the sharp corner.

17. A vehicle comprising:
a seat including a seat bottom and a seat back defining an occupant area between the seat bottom and the seat back; and
a door assembly including a door and a pusher, the door including a door outer and a door trim defining a cavity therebetween, and the pusher fixed to the door in the cavity between the door outer and the door trim and including a case containing a non-Newtonian fluid, the pusher aligned with the occupant area in a cross-vehicle direction;
wherein
the case includes a plurality of flat panels, wherein at least two of the flat panels are oriented at an oblique angle relative to each other; and
the case has a lower stiffness than the door outer.

18. The vehicle of claim 17, wherein the case includes a case body and a case lid sealed to the case body to define a pusher cavity, the non-Newtonian fluid being in the pusher cavity.

19. The vehicle of claim 18, wherein the non-Newtonian fluid is sealed in the pusher cavity.

20. A door assembly comprising:
a door including a door outer and a door trim defining a cavity therebetween; and
a pusher fixed to the door in the cavity between the door outer and the door trim and including a case containing a non-Newtonian fluid;
wherein the case includes a case body and a case lid sealed to the case body to define a pusher cavity, the non-Newtonian fluid being in the pusher cavity, wherein the case lid is hinged relative to the case body; and
the case has a lower stiffness than the door outer.

* * * * *